(12) United States Patent
Johnson et al.

(10) Patent No.: US 8,329,813 B2
(45) Date of Patent: Dec. 11, 2012

(54) THERMAL REDUCTION OF FLUOROETHER CARBOXYLIC ACIDS OR SALTS FROM FLUOROPOLYMER DISPERSIONS

(75) Inventors: David William Johnson, Washington, WV (US); Kenneth Scott Teter, Washington, WV (US)

(73) Assignee: E I du Pont de Nemours and Company, Wilmington, DE (US)

( * ) Notice: Subject to any disclaimer, the term of this patent is extended or adjusted under 35 U.S.C. 154(b) by 232 days.

(21) Appl. No.: 12/774,030

(22) Filed: May 5, 2010

(65) Prior Publication Data

US 2010/0286330 A1    Nov. 11, 2010

Related U.S. Application Data

(60) Provisional application No. 61/176,603, filed on May 8, 2009.

(51) Int. Cl.
*C08L 27/12* (2006.01)

(52) U.S. Cl. ......... 524/546; 524/544; 524/545; 526/242

(58) Field of Classification Search .................. 524/546, 524/544, 545; 526/242
See application file for complete search history.

(56) References Cited

U.S. PATENT DOCUMENTS

| | | | |
|---|---|---|---|
| 3,037,953 A | 6/1962 | Marks et al. | |
| 3,271,341 A | 9/1966 | Garrison, Jr. | |
| 3,282,875 A | 11/1966 | Connolly et al. | |
| 3,291,843 A | 12/1966 | Fritz et al. | |
| 3,391,099 A | 7/1968 | Punderson | |
| 3,704,272 A | 11/1972 | Holmes | |
| 4,358,545 A | 11/1982 | Ezzell et al. | |
| 4,369,266 A | 1/1983 | Weiss | |
| 4,380,618 A | 4/1983 | Khan et al. | |
| 4,552,631 A | 11/1985 | Bissott et al. | |
| 4,743,658 A | 5/1988 | Imbalzano et al. | |
| 4,940,525 A | 7/1990 | Ezzell et al. | |
| 5,476,974 A | 12/1995 | Moore et al. | |
| 5,637,748 A | 6/1997 | Hung et al. | |
| 5,969,192 A | 10/1999 | Marchionni et al. | |
| 6,177,196 B1 | 1/2001 | Brothers et al. | |
| 6,300,445 B1 | 10/2001 | Hung et al. | |
| 6,794,550 B2 * | 9/2004 | Hintzer et al. | 570/178 |
| 6,825,250 B2 * | 11/2004 | Epsch et al. | 523/310 |
| 6,833,403 B1 * | 12/2004 | Bladel et al. | 524/458 |
| 6,861,466 B2 * | 3/2005 | Dadalas et al. | 524/544 |
| 2005/0107506 A1 * | 5/2005 | Kapeliouchko et al. | 524/379 |
| 2006/0144794 A1 | 7/2006 | Malvasi et al. | |
| 2007/0015864 A1 | 1/2007 | Hintzer et al. | |
| 2007/0015937 A1 | 1/2007 | Hintzer et al. | |
| 2007/0025902 A1 | 2/2007 | Hintzer et al. | |
| 2008/0269408 A1 | 10/2008 | Brothers et al. | |
| 2009/0281261 A1 * | 11/2009 | Brothers et al. | 526/209 |

FOREIGN PATENT DOCUMENTS

| | | |
|---|---|---|
| EP | 0282875 B1 | 1/1992 |
| EP | 0816397 A1 | 1/1998 |
| EP | 0822175 A2 | 2/1998 |
| EP | 1526142 A1 | 4/2005 |
| EP | 1274771 B1 | 8/2005 |
| EP | 1845116 | 10/2007 |
| EP | 1538177 | 6/2008 |
| GB | 1292268 | 10/1972 |
| WO | 0035971 | 6/2000 |
| WO | 2005121290 A1 | 12/2005 |
| WO | 2007142888 A2 | 12/2007 |
| WO | 2009137734 A1 | 11/2009 |
| WO | WO-2010/129842 A1 * | 11/2010 |

OTHER PUBLICATIONS

Hisao Hori et al, "Efficient Decomposition of Perfluorocarboxylic Acids and Laternative Fluorochemical Surfactants in Hot Water", Environmental Science & Technology, 2008, 42 (19), 7438-7443.*
G. Cerichelli et al, "Specific Micellar Rate Effects on Unimolecular Decarboxylation and Cyclization", Journal of Physical Organic Chemistry, vol. 4, 71-76 (1991).
L. Brinchi et al, "Surfactant Effects on Decarboxylation of Alkoxynitrobenzisoxazole-3-Carboxylate Ions. Acceleration by Premicelles", Langmuir 2000, 16, 22-226.
T. Dwars et al, "Reactions in Micellar Systems", Angew. Chem. Int. Ed. 2005, 44, 7174-7199.
R. Noto et al, "Studies on Decarboxylation Reactions. Part 5[1]. Micellar Catalysis and Mixed Solvents Effects on the Decarboxylation of Some N-Alkyl- or N-Aryl-Substituted 5-Amino-1,3,4-Oxadiazole-2-Carboxylic Acids" J. Heterocyclic Chem., 24, 1449-1452 (1987).
Queste, Sebastien, International Search Report for PCT/US2010/033987, Dated Jul. 19, 2010.

* cited by examiner

*Primary Examiner* — Peter D. Mulcahy
*Assistant Examiner* — Henry Hu

(57) ABSTRACT

A process for reducing the fluoroether carboxylic acid or salt content of aqueous fluoropolymer dispersion. The fluoroether carboxylic acid or salt employed comprises fluoroether carboxylic acid or salt having the formula below:

$$[R^1\text{—O-L-COO}^-]Y^+$$

wherein R1 is a linear, branched or cyclic partially or fully fluorinated aliphatic group which may contain ether linkages; L is a branched partially or fully fluorinated alkylene group which may contain ether linkages; and Y+ is hydrogen, ammonium or alkali metal cation. The process comprises adding stabilizer to the aqueous fluoropolymer dispersion to form a stabilized aqueous fluoropolymer dispersion and heating the stabilized aqueous fluoropolymer dispersion to decarboxylate the fluoroether carboxylic acid or salt to produce a fluoroether byproduct. At least a portion of the fluoroether byproduct is removed.

23 Claims, No Drawings

THERMAL REDUCTION OF FLUOROETHER CARBOXYLIC ACIDS OR SALTS FROM FLUOROPOLYMER DISPERSIONS

FIELD OF THE INVENTION

The present invention relates to a process for the thermal reduction of fluoroether carboxylic acids or salts from fluoropolymer dispersions.

BACKGROUND OF THE INVENTION

Processes for the aqueous dispersion polymerization of fluoropolymer have typically employed a fluorosurfactant such perfluorooctanoic acid or its salts as a polymerization agent. Because of environmental concerns with regard to perfluorooctanoic acid and its salts, there is interest in reducing or eliminating perfluorooctanoic acid and its salts in fluoropolymer polymerization processes. Recently, there is an interest in using fluoroether carboxylic acids or salts in place of perfluoroalkane carboxylic acids or salts in the polymerization of fluoropolymers. In addition, fluoropolymer manufacturers desire to capture or otherwise contain the fluoroether carboxylic acids or salts employed. Since aqueous fluoropolymer dispersions made using fluoropolyether acids or salts may contain significant levels of residual fluoroether carboxylic acids or salts, there is a desire to reduce the level of residual fluoroether carboxylic acids or salts in such dispersions.

For example, US 2007/0015864 A1 discloses the use of fluoroether carboxylic acid surfactant in the aqueous dispersion polymerization of fluoropolymers and the reduction the fluoroether carboxylic acid surfactant in the dispersion. The fluoroether carboxylic acid surfactants of US 2007/0015864 A1 have the formula:

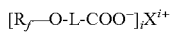

wherein L represents a linear partially or fully fluorinated alkylene group or an aliphatic hydrocarbon group, $R_f$ represents a linear partially or fully fluorinated aliphatic group or a linear partially or fully fluorinated aliphatic group interrupted with one or more oxygen atoms, and $X^{i+}$ represents a cation having a valence i and i is 1, 2, or 3. Surfactants of this formula are referred to hereinafter as "linear fluoroether carboxylic acids or salts".

US 2007/0015864 A1 describes several known techniques as being suitable for the reduction of the linear fluoroether carboxylic acids in the fluoropolymer dispersion: contacting the dispersion with anion exchange resin as disclosed in WO 00/35971; ultrafiltration as disclosed in e.g., U.S. Pat. No. 4,369,266; a method involving decantation as disclosed in EP 1 538 177; and a method involving steam distilling the free acid form of the fluorinated surfactant as disclosed in EP 1 274 771. The fluorosurfactant reduction methods described in US 2007/0015864 A1 are known to be complex and/or have significant disadvantages for the processing of fluoropolymer dispersion.

An improved process for reduction of fluoroether carboxylic acid or salt from fluoropolymer dispersion is desired, especially a simplified process which coordinates well with dispersion concentration operations.

SUMMARY OF THE INVENTION

The invention provides a process for reducing the fluoroether carboxylic acid or salt content of aqueous fluoropolymer dispersion. The fluoroether carboxylic acid or salt employed comprises fluoroether carboxylic acid or salt having Formula I below:

$$[R^1\text{—O-L-COO}^-]Y^+ \qquad (I)$$

wherein R1 is a linear, branched or cyclic partially or fully fluorinated aliphatic group which may contain ether linkages; L is a branched partially or fully fluorinated alkylene group which may contain ether linkages; and Y+ is hydrogen, ammonium or alkali metal cation. The process comprises adding stabilizer to the aqueous fluoropolymer dispersion to form a stabilized aqueous fluoropolymer dispersion and heating the stabilized aqueous fluoropolymer dispersion to decarboxylate the fluoroether carboxylic acid or salt to produce a fluoroether byproduct. At least a portion of the fluoroether byproduct is removed.

DETAILED DESCRIPTION OF THE INVENTION

Fluoroether Carboxylic Acid or Salt

In a process in accordance with the invention, any of a wide variety of branched fluoroether carboxylic acids or salts according to Formula I above can be reduced in amount in fluoropolymer dispersion. Fluoroethers of Formula I are referred to hereinafter as "branched fluoroether carboxylic acid or salt". Preferably, L in Formula I is a branched fully fluorinated alkylene group which may contain ether linkages and more preferably is —CF(CF$_3$)—. A single compound of Formula I or mixture of two or more compounds can be present in the dispersion.

The process of the invention especially useful when the fluoroether carboxylic acid or salt is highly fluorinated. "Highly fluorinated" means that at least about 50% of the total number of fluorine and hydrogen atoms in the fluorosurfactant are fluorine atoms. More preferably, at least about 75% of the total number of fluorine and hydrogen atoms in the fluoroether carboxylic acid or salt are fluorine atoms, most preferably at least about 90%. The process of the invention is particularly well adapted for the reduction of the amount of perfluoroether carboxylic acid or salt in fluoropolymer dispersion.

Branched fluoroether carboxylic acids or salts which can be reduced in accordance with one embodiment of the process of the invention are a compound or mixtures of compounds having a structure represented by formula (I) wherein $R^1$ is $CF_3$—$CF_2$—$CF_2$—O—(—$CFCF_3$—$CF_2$—O—)$_n$, n is 0-35 and L is —CF(CF$_3$)—. For convenience, these compounds may be represented by Formula II:

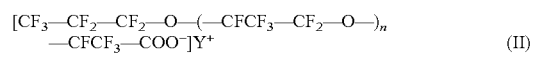

wherein n is 0-35 and $Y^+$ is hydrogen, ammonium or alkali metal cation. The invention is advantageous employed when n is 0-10 and especially when n is 0-3. The invention is particularly useful when $Y^+$ is hydrogen or ammonium.

In another embodiment of the invention, the process is used to reduce the branched fluoroether carboxylic acid or salt content of fluoropolymer dispersion polymerized in the presence of a polymerization agent comprising a mixture of branched fluoropolyether carboxylic acids or salts having a number average molecular weight of at least about 800 g/mol in combination with a branched fluoroether carboxylic acid or salt surfactant. Dispersions of this type are disclosed in US 2008/0269408 A1. Preferably, the branched fluoroether carboxylic acid or salt surfactant has a chain length of no greater than 6. "Chain length" as used in this application refers to the number of atoms in the longest linear chain in the hydrophobic tail of the fluoroether employed in the process of this invention, i.e., the portion of the structure in Formula I represented by $R^1$—O-L-. Chain length includes atoms such as oxygen atoms in addition to carbon in the chain of hydrophobic tail of the surfactant but does not include branches off of the longest linear chain or include the carbon atom of the carboxylate group. Preferably, the chain length is 4 to 6 atoms. In accordance with another preferred form of the invention the chain length is 3 to 5 atoms. Most preferably, the chain length of is 4 to 5 atoms.

For example, dispersions treated in accordance with a preferred embodiment of the process of the invention may contain a branched fluoroether carboxylic acid or salt surfactant according to Formula II when n equals 0, and may be represented by Formula III below:

$$[CF_3CF_2CF_2OCF(CF_3)COO^-]Y^+ \quad (III)$$

wherein $Y^+$ is hydrogen, ammonium, or alkali metal cation. This compound is referred to hereinafter as dimer acid (DA) in acid form and dimer acid salt (DAS) in salt form. The chain length of this compound is 5. A compound of this formula can be obtained from the perfluoro-2-propoxypropionyl fluoride intermediate prepared according U.S. Pat. No. 3,291,843 or dimerization of hexafluoropropylene oxide and subsequent hydrolysis of the resulting acyl fluoride to carboxylic acid in the case of the acid and, in the case of the salt, by simultaneous or subsequent reaction with the appropriate base to the produce the desired salt. A procedure for dimerization of hexafluoropropylene oxide is disclosed in G.B. Patent 1 292 268.

Fluoropolymers and Dispersion Polymerization

The process in accordance with the invention is useful for a wide variety of fluoropolymer dispersions comprising particles of fluoropolymer made from at least one fluorinated monomer, i.e., wherein at least one of the monomers contains fluorine, preferably an olefinic monomer with at least one fluorine or a perfluoroalkyl group attached to a doubly-bonded carbon. The fluorinated monomer may be independently selected from the group consisting of tetrafluoroethylene (TFE), hexafluoropropylene (HFP), chlorotrifluoroethylene (CTFE), trifluoroethylene, hexafluoroisobutylene, perfluoroalkyl ethylene, fluorovinyl ethers, vinyl fluoride (VF), vinylidene fluoride (VF2), perfluoro-2,2-dimethyl-1,3-dioxole (PDD), perfluoro-2-methylene-4-methyl-1,3-dioxolane (PMD), perfluoro(allyl vinyl ether) and perfluoro(butenyl vinyl ether). A preferred perfluoroalkyl ethylene monomer is perfluorobutyl ethylene (PFBE). Preferred fluorovinyl ethers include perfluoro(alkyl vinyl ether) monomers (PAVE) such as perfluoro(propyl vinyl ether) (PPVE), perfluoro(ethyl vinyl ether) (PEVE), and perfluoro (methyl vinyl ether) (PMVE). Non-fluorinated olefinic comonomers such as ethylene and propylene can be copolymerized with fluorinated monomers.

Fluorovinyl ethers also include those useful for introducing functionality into fluoropolymers. These include $CF_2$=CF—(O—$CF_2CFR_f)_a$—O—$CF_2CFR'_fSO_2F$, wherein $R_f$ and $R'_f$ are independently selected from F, Cl or a perfluorinated alkyl group having 1 to 10 carbon atoms, a=0, 1 or 2. Polymers of this type are disclosed in U.S. Pat. No. 3,282,875 ($CF_2$=CF—O—$CF_2CF(CF_3)$—O—$CF_2CF_2SO_2F$, perfluoro(3,6-dioxa-4-methyl-7-octenesulfonyl fluoride)), and in U.S. Pat. Nos. 4,358,545 and 4,940,525 ($CF_2$=CF—O—$CF_2CF_2SO_2F$). Another example is $CF_2$=CF—O—$CF_2$—$CF(CF_3)$—O—$CF_2CF_2CO_2CH_3$, methyl ester of perfluoro (4,7-dioxa-5-methyl-8-nonenecarboxylic acid), disclosed in U.S. Pat. No. 4,552,631. Similar fluorovinyl ethers with functionality of nitrile, cyanate, carbamate, and phosphonic acid are disclosed in U.S. Pat. Nos. 5,637,748; 6,300,445; and 6,177,196.

The invention is especially useful for reducing the amount of branched fluoroether carboxylic acid or salt in aqueous dispersions of polytetrafluoroethylene (PTFE) including modified PTFE. PTFE and modified PTFE typically have a melt creep viscosity of at least about $1 \times 10^8$ Pa·s and, with such high melt viscosity, the polymer does not flow significantly in the molten state and therefore is not a melt-processible polymer. Polytetrafluoroethylene (PTFE) refers to the polymerized tetrafluoroethylene by itself without any significant comonomer present. Modified PTFE refers to copolymers of TFE with such small concentrations of comonomer that the melting point of the resultant polymer is not substantially reduced below that of PTFE. The concentration of such comonomer is preferably less than 1 wt %, more preferably less than 0.5 wt %. A minimum amount of at least about 0.05 wt % is preferably used to have significant effect. The small amount of comonomer modifier improves film forming capability during baking (fusing). Comonomer modifiers include perfluoroolefin, notably hexafluoropropylene (HFP) or perfluoro(alkyl vinyl ether) (PAVE), where the alkyl group contains 1 to 5 carbon atoms, with perfluoro(ethyl vinyl ether) (PEVE) and perfluoro(propyl vinyl ether) (PPVE) being preferred. Chlorotrifluoroethylene (CTFE), perfluorobutyl ethylene (PFBE), or other monomer that introduces bulky side groups into the molecule are also possible comonomer modifiers.

The invention is also especially useful for reducing the fluoroether carboxylic acid or salt content of dispersions of melt-processible fluoropolymers. By melt-processible, it is meant that the polymer can be processed in the molten state (i.e., fabricated from the melt into shaped articles such as films, fibers, and tubes etc. that exhibit sufficient strength and toughness to be useful for their intended purpose) using conventional processing equipment such as extruders and injection molding machines. Examples of such melt-processible fluoropolymers include homopolymers such as polychlorotrifluoroethylene or copolymers of tetrafluoroethylene (TFE) and at least one fluorinated copolymerizable monomer (comonomer) present in the polymer usually in sufficient amount to reduce the melting point of the copolymer substantially below that of TFE homopolymer, polytetrafluoroethylene (PTFE), e.g., to a melting temperature no greater than 315° C.

A melt-processible TFE copolymer typically incorporates an amount of comonomer into the copolymer in order to provide a copolymer which has a melt flow rate (MFR) of about 1-100 g/10 min as measured according to ASTM D-1238 at the temperature which is standard for the specific copolymer. Preferably, the melt viscosity is at least about $10^2$ Pa·s, more preferably, will range from about $10^2$ Pa·s to about $10^6$ Pa·s, most preferably about $10^3$ to about $10^5$ Pa·s measured at 372° C. by the method of ASTM D-1238 modified as described in U.S. Pat. No. 4,380,618. Additional melt-processible fluoropolymers are the copolymers of ethylene (E) or propylene (P) with TFE or CTFE, notably ETFE, ECTFE and PCTFE.

A preferred melt-processible copolymer formed in the practice of the present invention comprises at least about 40-98 mol % tetrafluoroethylene units and about 2-60 mol % of at least one other monomer. Preferred comonomers with TFE are perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms, and the copolymer can be made using several PAVE monomers. Preferred TFE copolymers include FEP (TFE/HFP copolymer), PFA (TFE/PAVE copolymer), TFE/HFP/PAVE wherein PAVE is PEVE and/or PPVE, MFA (TFE/PMVE/PAVE wherein the alkyl group of PAVE has at least two carbon atoms) and THV (TFE/HFP/VF2).

Further useful polymers are film forming polymers of polyvinylidene fluoride (PVDF) and copolymers of vinylidene fluoride as well as polyvinyl fluoride (PVF) and copolymers of vinyl fluoride.

The invention may also be used to reduce the branched fluoroether carboxylic acid or salt in dispersions of fluorocarbon elastomers. These elastomers typically have a glass transition temperature below 25° C. and exhibit little or no crystallinity, i.e. they are amorphous at room temperature. Fluorocarbon elastomer copolymers made by the process of this invention typically contain 25 to 70 wt %, based on total weight of the fluorocarbon elastomer, of copolymerized units of a first fluorinated monomer which may be vinylidene fluoride (VF2) or tetrafluoroethylene (TFE). The remaining units in the fluorocarbon elastomers are comprised of one or more additional copolymerized monomers, different from the first monomer, selected from the group consisting of fluorinated monomers, hydrocarbon olefins and mixtures thereof. Fluorocarbon elastomers prepared by the process of the present invention may also, optionally, comprise units of one or more cure site monomers. When present, copolymerized cure site monomers are typically at a level of 0.05 to 7 wt %, based on total weight of fluorocarbon elastomer. Examples of suitable cure site monomers include: i) bromine-, iodine-, or chlorine-containing fluorinated olefins or fluorinated vinyl ethers; ii) nitrile group-containing fluorinated olefins or fluorinated vinyl ethers; iii) perfluoro(2-phenoxypropyl vinyl ether); and iv) non-conjugated dienes.

Preferred TFE based fluorocarbon elastomer copolymers include TFE/PMVE, TFE/PMVE/E, TFE/P and TFE/P/VF2. Preferred VF2 based fluorocarbon elastomer copolymers include VF2/HFP, VF2/HFP/TFE, and VF2/PMVE/TFE. Any of these elastomer copolymers may further comprise units of cure site monomer.

Fluoropolymer dispersions to be treated in accordance a process of the invention can be made in a batch process in a pressured reactor. Suitable vertical or horizontal reactors for carrying out the process of the invention are equipped with stirrers for the aqueous medium to provide sufficient contact of gas phase monomers such as TFE for desirable reaction rates and uniform incorporation of comonomers if employed. The reactor preferably includes a cooling jacket surrounding the reactor so that the reaction temperature may be conveniently controlled by circulation of a controlled temperature heat exchange medium.

In a typical process employing of the type disclosed in US 2008/0269408 A1 employing a polymerization agent comprising a branched fluoropolyether carboxylic acid or salt having a number average molecular weight of at least about 800 g/mol in combination with a branched fluoroether carboxylic acid or salt surfactant, the reactor is first charged with deionized and deaerated water of the polymerization medium and fluoropolyether carboxylic acid or salt and fluoroether carboxylic acid or salt surfactant are dispersed in the medium. For PTFE homopolymer and modified PTFE, paraffin wax as stabilizer is often added. A suitable procedure for PTFE homopolymer and modified PTFE includes first pressurizing the reactor with TFE. If used, the comonomer such as HFP or perfluoro (alkyl vinyl ether) is then added. A free-radical initiator solution such as ammonium persulfate solution is then added. For PTFE homopolymer and modified PTFE, a second initiator which is a source of succinic acid such as disuccinyl peroxide may be present in the initiator solution to reduce coagulum. Alternatively, a redox initiator system such as potassium permanganate/oxalic acid is used. The temperature is increased and, once polymerization begins, additional TFE is added to maintain the pressure. The beginning of polymerization is referred to as kick-off and is defined as the point at which gaseous monomer feed pressure is observed to drop substantially, for example, about 10 psi (about 70 kPa). Comonomer and/or chain transfer agent can also be added as the polymerization proceeds. For some polymerizations, additional monomers, initiator and or polymerization agent may be added during the polymerization.

After batch completion (typically several hours) when the desired amount of polymer or solids content has been achieved, the feeds are stopped, the reactor is vented and purged with nitrogen, and the raw dispersion in the vessel is transferred to a cooling vessel.

The dispersion polymerization of melt-processible copolymers is similar except that comonomer in significant quantity is added to the batch initially and/or introduced during polymerization. Chain transfer agents are typically used in significant amounts to decrease molecular weight to increase melt flow rate.

The polymerization may also be carried out as a continuous process in a pressurized reactor. A continuous process is especially useful for the manufacture of fluorocarbon elastomers.

Preferred dispersions for use in the process of the invention are made using a polymerization agent comprising a branched fluoropolyether carboxylic acid or salt having a number average molecular weight of at least about 800 g/mol in combination with a branched fluoroether carboxylic acid or salt surfactant with the mixture of branched fluoropolyether carboxylic acids or salts preferably being employed having a composition represented by Formula II above wherein $Y^+$ is hydrogen, ammonium or alkali metal cation, wherein n is at least 1 and has an average value of about 3 to about 13 (number average molecular weight of about 800 to about 2500 g/mol). In this preferred mixture, the amount of perfluoropolyether acid or salt wherein n is 1 is not more than 50 ppm by weight of the total amount of perfluoropolyethers in the mixture. The amount of perfluoropolyethers in the mixture wherein n is 13 or greater is not more than 40% by weight of the total amount of perfluoropolyethers in the mixture. In preferred embodiments, the amount of perfluoropolyethers in the mixture where n is greater than 13 is not more than 35% by weight, not more than 30% by weight, not more than 20% by weight, not more than 10% by weight and not more than 7.5%. In preferred embodiments, $Y^+$ is hydrogen or ammonium.

In another embodiment of the process to make the preferred dispersions for use in the practice of the invention, the amount of perfluoropolyether carboxylic acids or salts in the mixture wherein n is 16 or greater is not more than 10% by weight of the total amount of perfluoropolyethers in the mixture. In preferred embodiments of the invention, the amount of perfluoropolyether carboxylic acids or salts in the mixture where n is 16 or greater is not more than 7% by weight, not more than 5% by weight, and not more than 3% by weight.

In a further embodiment, the amount of perfluoropolyethers in the mixture wherein n is 4 or less is not more than 10% by weight of the total amount of perfluoropolyethers in the mixture, more preferably not more than 1% by weight of the total amount of perfluoropolyethers in the mixture.

In yet another embodiment of the process to make preferred dispersions for use in the practice of the invention, at least about 50% by weight of the perfluoropolyethers in the mixture fall within the range of n=3 to n=13. In other embodiments of the invention, at least about 60% by weight of the perfluoropolyethers in the mixture fall within the range of n=3 to n=13, preferably 75%, and more preferably 90% by weight of the perfluoropolyethers.

In further embodiments of the process to make preferred dispersions for use in the practice of the invention, the composition comprises a mixture of perfluoropolyether acids or salts of formula II wherein n has an average value of about 4 to about 13 (number average molecular weight of about 1000 to about 2500 g/mol), preferably an average value of about 5 to about 13 (number average molecular weight of about 1150 to about 2500 g/mol), more preferably an average value of about 5 to about 10 (number average molecular weight of about 1150 to about 1700 g/mol).

A mixture of perfluoropolyether acids or salt can be prepared by the polymerization of hexafluoropropylene oxide (HFPO) forming the perfluoropolyether acyl fluoride. The reaction product of the polymerization of hexafluoropropylene oxide is a mixture of perfluoropolyethers of varying degree of polymerization resulting in a distribution of various molecular weight oligomers. Low molecular weight oligomers are separated by distillation and recycled. In a preferred embodiment, the acyl fluoride can be hydrolyzed to carboxylic acid and converted to the salt if desired by use of the appropriate base such as ammonium hydroxide to form the ammonium salt.

The mixture of perfluoropolyether carboxylic acids or salts with the limits stated above on the amount of both low molecular weight and high molecular weight fractions for use in making preferred dispersions for use in the process of the present invention can be obtained via fractional distillation of the acyl fluoride.

In the process for making preferred dispersions employing a polymerizing agent comprising a branched fluoropolyether carboxylic acid or salt having a number average molecular weight of at least about 800 g/mol in combination with a branched fluoroether carboxylic acid or salt surfactant, the ratio in the polymerization agent of the weight of the fluorosurfactant to the weight of the mixture of perfluoropolyether carboxylic acids or salts is about 2:1 to about 200:1. In other embodiments, the ratio of the weight of the fluorosurfactant to the weight of the mixture of perfluoropolyether acids or salts is about 3:1 to about 150:1, preferably about 5:1 to about 100:1, more preferably 10:1 to about 80:1.

In a preferred polymerization process for making dispersions for use in the practice of the invention, the amount of the mixture of fluoropolyether acid or salt having a number average molecular weight of at least about 800 g/mol employed as polymerization agent in the aqueous polymerization medium preferably is present in the range of about 5 to about 3,000 ppm based on the weight of water in the aqueous polymerization medium.

To form the polymerization agent for use in making preferred dispersions for use in the process of the present invention comprising a branched fluoropolyether carboxylic acid or salt having a number average molecular weight of at least about 800 g/mol in combination with a branched fluoroether carboxylic acid or salt surfactant, the mixture of branched perfluoroether carboxylic acid or salt and branched fluoroether carboxylic acid or salt surfactant are preferably dispersed adequately in aqueous medium to function effectively as a polymerization agent. "Dispersed" as used in this application refers to either dissolved in cases in which the mixture of branched fluoropolyether carboxylic acid or salt and branched fluoroether carboxylic acid or salt surfactant are soluble in the aqueous medium or dispersed in cases in which the mixture of fluoropolyether carboxylic acid or salt and/or the fluoroether carboxylic acid or salt surfactant are not fully soluble and are present in very small particles, for example about 1 nm to about 1 μm, in the aqueous medium. Similarly, "dispersing" as used in this application refers to either dissolving or dispersing the mixture of branched fluoropolyether acid or salt and/or the branched fluoroether carboxylic acid or salt surfactant so that they are dispersed as defined above. Preferably, the mixture of branched fluoropolyether carboxylic acids or salts and branched fluoroether carboxylic acid or salt surfactant are dispersed sufficiently so that the polymerization medium containing the mixture of branched fluoropolyether carboxylic acids or salts and branched fluoroether carboxylic acid or salt surfactant appears water clear or nearly water clear. Clarity of the mixture is typically an indicator of improved polymerization performance, e.g., polymerizations employing mixtures of lower haze typically produce less undispersed polymer (coagulum) than mixtures with higher haze values.

Dispersing of the mixture of branched fluoropolyether carboxylic acids or salts and the branched fluoroether carboxylic acid or salt surfactant can be carried out by a variety of methods. In one suitable procedure, the polymerization agent can be made directly in the aqueous polymerization medium. In this procedure, the mixture of branched fluoropolyether carboxylic acids or salts is supplied in acid form and subsequently converted to salt form. This is accomplished by first adding ammonium hydroxide or alkali metal hydroxide, preferably ammonium hydroxide, to the aqueous polymerization medium in a quantity sufficient to substantially completely convert to salt form the subsequently added fluoropolyether carboxylic acid mixture. The branched fluoropolyether carboxylic acid can then be added to the ammonium hydroxide or alkali metal hydroxide solution and, if desired, pH measurements can be made to determine if insufficient or excess base has been used. In addition, as known in the art, the amount of ammonium hydroxide or alkali metal hydroxide used, together with other materials added to the polymerization medium, should provide a pH in the aqueous polymerization medium which promotes the desired level of activity for the particular initiator system used and provides an operable pH range for the polymerization agent. The branched fluoroether carboxylic acid or salt surfactant can be added to the aqueous polymerization medium prior to, simultaneously with or subsequently to the addition of the mixture of branched fluoropolyether carboxylic acid.

In a preferred embodiment, the branched fluoroether carboxylic acid or salt and the mixture of branched fluoropolyether carboxylic acids or salts are both supplied in acid form. It has been discovered that the mixture of branched fluoropolyether carboxylic acids and branched fluoropolyether carboxylic acid fluorosurfactant will form a mixture which can be converted to salt form to make a concentrate in which the branched fluoropolyether carboxylate salt is dispersed. The concentrate is advantageously used to provide the branched fluoroether carboxylic acid or salt surfactant and the mixture of branched fluoropolyether carboxylic acids or salts to the aqueous medium in dispersed form.

Aqueous dispersions of fluoropolymer particles produced as described above and which may be treated in accordance with the invention typically have a raw dispersion particle size (RPDS) of from about 10 to about 400 nm. Most commercial dispersions will have a raw dispersion particle size in the range of 100 to 350 nm.

As-polymerized dispersions can be treated in accordance with the invention with the addition of stabilizer as will be discussed in more detail hereinafter. Such dispersions typically have solids contents ranging from about 20 to about 50 wt %. Concentrated dispersions having a higher solids content, e.g., about 35 to about 70 wt % can also be treated in accordance with the invention. Normally a stabilizer is already present in concentrated dispersion since a stabilizer is typically added prior to the concentration process. As discussed in more detail hereinafter, the process of the present invention is advantageously coordinated with dispersion concentration steps which can result in significant efficiency improvements in dispersion manufacturing.

Stabilizers

In the process of the invention, stabilizer is added to the aqueous fluoropolymer dispersion to form stabilized aqueous fluoropolymer dispersion. The stabilized aqueous fluoropolymer dispersion is then processed to reduce the level of fluoroether carboxylic acid or salt. A variety of stabilizers can be used in the process of this invention to stabilize the dispersion. Stabilizers include nonionic surfactants, anionic surfactants, cationic surfactants, anionic polyelectrolyte dispersing agents and mixtures thereof. The type of stabilizer employed may be selected dependent upon subsequent dispersion processing steps such type of concentration procedure, if used, and upon intended end use for the dispersion. Preferred stabilizers are non-fluorinated and it should be understood that the types of stabilizers described below typically are non-fluorinated. Nonionic surfactants are especially useful for the practice of the invention.

Stabilizer is added to the fluoropolymer dispersion in an effective amount for dispersion stabilization during the process of the invention. The amount of stabilizer will vary depending upon stabilizer type and the conditions to be employed in the branched fluoroether carboxylic acid or salt reduction process. The amount of stabilizer employed may also take into account subsequent process steps such as dispersion concentration and the properties desired for end use processing. In general, stabilizer is added in an amount of about 0.01 wt % to about 30 wt % based on the fluoropolymer solids content of the dispersion.

Nonionic Surfactants

Nonionic surfactants include aromatic alcohol ethoxylates such as those disclosed in U.S. Pat. No. 3,037,953 and in U.S. Pat. No. 3,704,272. However, due to environmental concerns concerning aromatic compounds, preferred nonionic surfactants are aliphatic alcohol ethoxylates or mixtures thereof. If thermal phase separation will be used for concentration, the nonionic surfactant selected should have suitable cloud point for this purpose, e.g., between about 30° C. to about 90° C. In addition, depending upon the intended end use, there may be other desirable properties for the nonionic surfactant such as low burn off temperature, low foaming, etc. Suitable aliphatic alcohol ethoxylates are disclosed in Marks et al., U.S. Pat. No. 3,037,953 and Miura et al., U.S. Pat. No. 6,153,688. Nonionic surfactants are preferably added in an amount greater than about 0.5 wt % based on the fluoropolymer solids content of the dispersion, more preferably, about 1 wt % to about 10 wt %.

Especially suitable aliphatic alcohol ethoxylates for use in the process of the invention are a compound or mixture of compounds of the formula:

(R$_1$)(R$_2$)CH(OCH$_2$CH$_2$)$_n$OH wherein R$_1$ and R$_2$ are unbranched or branched alkyl, unbranched or branched alkenyl, cycloalkyl, or cycloalkenyl hydrocarbon groups and the total carbon atoms in R$_1$ and R$_2$ is 7-17 and n is an average value of 4 to 18. Preferably, at least one of R$_1$ or R$_2$ is a branched or cyclic hydrocarbon group. The number of ethylene oxide units in the hydrophilic portion of the molecule may comprise either a broad or narrow monomodal distribution as typically supplied or a broader or bimodal distribution which may be obtained by blending.

In a preferred embodiment of the invention, nonionic surfactant has a static surface tension as 0.1 wt % aqueous solutions at 25° C. of less than about 29 dynes/cm, more preferably less than about 28 dynes/cm.

Nonionic surfactants of the type generally used to stabilize fluoropolymer dispersions can be either liquids or solids at room temperature. If solid, the surfactant tends to be pasty and difficult to handle. They can be handled but often require heated tanks and transfer lines to keep them as a liquid. In addition to the capital cost of the heated equipment, there are operational restrictions placed on the system. If the temperature is maintained too low, tanks and transfer lines can become plugged with solid material. If the temperature is too high, degradation of the surfactant can occur.

In accordance with a particularly preferred embodiment of the invention, the nonionic surfactant employed in the aqueous dispersion of the invention is an ethoxylate of 2,6,8-trimethyl-4-nananol. In a more preferred form of this dispersion, the aliphatic alcohol ethoxylate nonionic surfactant comprises ethoxylates of 2,6,8-trimethyl-4-nananol having an average of about 4 to about 12 ethylene oxide (EO) units, most preferably, ethoxylates of 2,6,8-trimethyl-4-nananol having an average about 9 to about 11 ethylene oxide units. Examples of preferred surfactants of this type are those sold under the trademark Tergitol® TMN-6 (nominally 6 EO units) and Tergitol® TMN-10 (nominally 10 EO units) which are available from Dow Chemical Corporation. A blend of 30% Tergitol® TMN-6 and 70% Tergitol® TMN-10 is also available from Dow Chemical Corporation as Tergitol® TMN-100X.

Another suitable ethoxylate of saturated or unsaturated secondary alcohol having 8-18 carbon atoms includes the surfactant sold under the trademark Leocol® TD-90 by the Lion Corporation, Japan. This surfactant is a branched ethoxylate represented by the formula C$_{13}$H$_{27}$O(C$_2$H$_4$O)$_9$H formed from a branched secondary alcohol.

Anionic Surfactants

Suitable anionic surfactants that may be used for dispersion stabilization include surfactants that have an acid group, in particular a sulfonic or carboxylic acid group. Examples of anionic surfactants include surfactants that have one or more anionic groups. Anionic surfactants may include, in addition to one or more anionic groups, also other hydrophilic groups such as polyoxyalkylene groups having 2 to 4 carbons in the oxyalkylene group, such as polyoxyethylene groups. Suitable anionic surfactants include anionic hydrocarbon surfactants. The term "anionic hydrocarbon surfactants" as used herein comprises surfactants that comprise one or more hydrocarbon moieties in the molecule and one or more anionic groups, in particular acid groups such as sulfonic, sulfuric, phosphoric and carboxylic acid groups and salts thereof. Examples of hydrocarbon moieties of the anionic hydrocarbon surfactants include saturated and unsaturated aliphatic groups having for example 6 to 40 carbon atoms, preferably 8 to 20 carbon atoms. Such aliphatic groups may be linear or branched and may contain cyclic structures. The hydrocarbon moiety may also be aromatic or contain aromatic groups. Additionally, the hydrocarbon moiety may contain one or more hetero atoms such as for example oxygen, nitrogen and sulfur. Anionic surfactants are preferably used in an amount greater than about 0.5 wt % based on the fluoropolymer solids content of the dispersion, more preferably, about 1 wt % to about 10 wt %.

Examples of anionic hydrocarbon surfactants for use in this invention include alkyl sulfonates such as lauryl sulfonate, alkyl sulfates such as lauryl sulfate, alkylarylsulfonates and alkylarylsulfates, fatty (carboxylic) acids and salts thereof such as lauric acids and salts thereof and phosphoric acid alkyl or alkylaryl esters and salts thereof. Commercial anionic hydrocarbon surfactants are typically sodium salts. Commercially available anionic hydrocarbon surfactants that can be used include Polystep® A16 (sodium dodecylbenzyl sulphonate) from Stepan Company, Hostapur® SAS 30 (secondary alkyl sulphonate sodium salt), Emulsogen® LS (sodium lauryl sulfate) and Emulsogen® EPA 1954 (mixture of $C_{12}$ to $C_{14}$ sodium alkyl sulfates) available from Clariant GmbH, Edenor® C-12 (Lauric acid) available from Cognis and Triton® X-200 (sodium alkylsulfonate) available from Union Carbide.

Anionic Polyelectrolyte Dispersing Agents

Suitable anionic polyelectrolyte dispersing agents as stabilizers for use in the present invention are disclosed in US 2006/0144794 A1 and WO 2007/0142888. The anionic polyelectrolyte dispersing agents are preferably anionic polymers, having a linear or branched structure, with anionic groups distributed along the polymeric chain, optionally present also in the chain end groups. The polyelectrolyte dispersing agents preferably have an equivalent weight, defined as molecular weight/number of anionic groups present in the polyelectrolyte, greater than about 150, preferably greater than about 200, still more preferably greater than about 250. Generally the equivalent weight of the anionic polyelectrolyte dispersing agents usable in the process of the present invention is less than about 50,000, preferably less than about 10,000, more preferably less than about 3,000, still more preferably less than about 1,500.

The number average molecular weight of the anionic polyelectrolyte dispersing agent is preferably at least about 500, more preferably in the range of about 500 to about 100,000. More preferably, the molecular weight is at least about 1,000. Especially preferred embodiments have a molecular weight of about 2,000 to about 100,000 and preferably 5,000 to about 20,000.

The anionic polyelectrolyte dispersing agents usable in the process according to the present invention preferably contain in the molecule a number of anionic functional groups higher than or equal to 2, more preferably greater than or equal to 5. The anionic groups present in the molecule of the anionic polyelectrolyte agents are preferably selected from carboxylates, sulphates, sulphonates, phosphates, phosphonates, are more preferably carboxylates, sulphates, sulphonates, and still more preferably are carboxylates. Generally, the anionic polyelectrolyte dispersing agents do not contain fluorine atoms.

Anionic polyelectrolytes dispersing agents are preferably used in an amount of 0.03 wt % to about 10 wt % based on the weight of the fluoropolymer solids in the dispersion.

Cationic Surfactants

In accordance with one embodiment of the present invention, the cationic surfactants can be used to stabilize the dispersion for use in the process of the present invention. Suitable cationic surfactants include quaternary ammonium halide or hydroxide, preferably a compound of the formula:

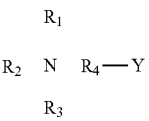

where $R_1$ is a long chain alkyl hydrocarbon, an alkylated aryl hydrocarbon and $R_2$, $R_3$, and $R_4$ are alkyl groups, preferably having 1-16 carbon atoms. The alkyl groups may contain cyclic structures and may be either linear or branched and Y can be F, Cl, Br or OH. Preferably $R_1$ is an alkyl group containing between 8 and 28 carbon atoms, more preferably between 12 and 18 carbon atoms.

In one embodiment, $R_2$, $R_3$, and $R_4$ are the same or different and are selected from the group comprising methyl or ethyl. Two suitable surfactants are dodecyl trimethyl ammonium bromide and cetyl trimethyl ammonium bromide (CTMAB). CTMAB is also known as hexadecyl trimethyl ammonium bromide.

Cationic surfactants are preferably used in an amount greater than about 0.5 wt % based on the fluoropolymer solids content of the dispersion, more preferably, about 1 wt % to about 10 wt %.

Thermal Reduction Process

In accordance with the invention, the process includes heating the stabilized aqueous fluoropolymer dispersion to decarboxylate the fluoroether carboxylic acid or salt to produce a fluoroether byproduct. Preferably, the heating is carried out at a temperature and under conditions which promotes a suitable rate of decarboxylation without being detrimental to the dispersion, e.g., causing the formation of significant amounts of coagulated fluoropolymer. In accordance with embodiments of the present invention, the fluoropolymer dispersion is heated to a temperature of about 70° C. to about 200° C., in another embodiment to about 75° C. to about 150° C., in yet another embodiment to about 80° C. to about 125° C., in yet another embodiment to about 85° C. to about 110° C., and in yet another embodiment to about 90° C. to about 100° C.

When nonionic surfactants with a cloud point are used and the temperature used for decarboxylation is above the cloud point range, unexpectedly, branched fluoroether carboxylic acids or acids in the dispersions can be effectively decarboxylated with little coagulum formation.

Any of a variety of heated vessels can be used to carry out the process which can provide the desired heat transfer to heat the dispersion to the desired temperature. Typically, the vessel should be closed to prevent escape of the fluoroether byproduct and be equipped with appropriate outlet to enable the fluoroether byproduct to be removed. Pressurized vessels can be employed if it is desired to carry out the process at elevated pressures. Similarly, if it is desired to operate the process under vacuum, the vessel should be suitably equipped for operating under reduced pressures.

Other process conditions may be advantageously employed during heating to promote decarboxylation while avoiding detrimental affects on the dispersion. Agitation is generally beneficial to the rate of decarboxylation but high shear conditions typically should be avoided. For example, it is generally desirable to avoid stirring methods in which a stirrer is in contact with, or very close to, the surface of the vessel being used to carry out the process. Boiling of the aqueous medium can provide good agitation but has been observed to cause some coagulation of the dispersion of fluoropolymer in the dispersion. To avoid boiling at temperatures above 100° C., the process can be carried out at elevated pressures if desired.

The duration of the heating needed to reduce the branched fluoroether carboxylic acid or salt to the desired level will vary depending upon the starting level of branched fluoroether carboxylic acid or salt and the process conditions employed. Typically, the desired level will be achieved during a time period of about 30 minutes to about 30 hours. Reduction of fluoroether carboxylic acid or salt to a desired level is preferably accomplished in less than about 24 hours. In embodiments of the invention, reduction of fluoroether carboxylic acid or salt to a desired level is accomplished in less than about 15 hours, in another embodiment less than about 12 hours, in yet another embodiment less than about 10 hours, in yet another embodiment less than about 8 hours, in yet another embodiment less than about 4 hours, and in yet another embodiment less than about 3 hours.

The process of the invention preferably provides a stabilized aqueous fluoropolymer dispersion comprising less than about 500 ppm branched fluoroether carboxylic acid or salt. In preferred embodiments, the dispersion comprises less than about 300 ppm branched fluoroether carboxylic acid or salt, more preferably less than 100 ppm, still more preferably less than about 50 ppm, and most preferably less than about 20 ppm.

As illustrated in the Decarboxylation Examples which follow, both branched and linear fluoroether carboxylic acids or salts decarboxylate upon heating but branched fluoroether carboxylic acids or salts which are employed in the process of the invention do so at a lower temperature as indicated by a lower Temperature of Maximum Decarboxylation. In addition, the Decarboxylation Half Life ($t_{1/2}$) at 200° C. for branched fluoroether carboxylic acids or salts are significantly lower. Preferably, a branched fluoroether carboxylic acid or salt employed in accordance with the present invention has a Decarboxylation Half Life ($t_{1/2}$) measured as the ammonium salt at 200° C. of less than about 30 minutes, more preferably, less than about 20 minutes, most preferably, less than about 10 minutes.

Since the salt form of branched fluoroether carboxylic acid typically is more readily decarboxylated than the acid form, higher rates and higher fluoroether byproduct yields are promoted by employing suitable pH so that a significant portion of the residual fluoroether carboxylic acid is in salt form, i.e., above the pKa of the fluoroether carboxylic acid. A pH of above about 7 is advantageously employed. In another embodiment of the invention, pH is above about 9. Adjustment of pH can suitably be accomplished by addition of $NH_4OH$ to the dispersion. pH ranges for the advantageous practice of the invention can be the normal pH desirable for processing and storage of the dispersion.

Decarboxylation results in the evolution of carbon dioxide and produces hydrofluoroether byproducts of the branched fluoroether carboxlic acids or salts. For example, when preferred fluoroether carboxylic acids or salts of the following Formula II above, the hydrofluoroether byproducts are the corresponding 2-hydrofluoroethers of the following structure shown in Formula IV:

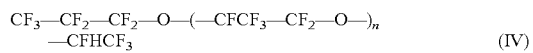

(IV)

Compounds of this structure are known and are useful industrially for various uses, e.g., as solvents. A compound of this structure when n=0 is available commercially from the DuPont Company as "E1 Stable Fluid" or "Freon® E-1". Compounds of this structure when n=1 and n=2 are available from DuPont as "Freon® E-2" and "Freon® E-3", respectively. In addition, the 2-hydrofluorethers of formula IV can be fluorinated to produce perfluoropolyethers which are useful for a variety of uses, e.g., as lubricants such as the oils and greases sold under the trademark Krytox® by the DuPont Company.

In accordance with the process of the invention, at least a portion of the fluoroether byproduct is removed. In one embodiment of the process, fluoroether byproduct is removed as a vapor. For example, when dimer acid salt (DAS) is the branched fluoroether acid or salt being removed in the process of the invention, the boiling point of the 2-hydrofluorether byproduct (E1 Stable Fluid) is ~46° C. At process temperatures within the temperature ranges described above and at atmospheric pressure, the E1 Stable Fluid will be present in vapor form and can be removed by venting it from the vessel. In this embodiment of the invention, it may be desirable circulate a gas such as nitrogen or air over the surface of the dispersion in the vessel to promote removal from the vessel and/or reduce dissolved fluoroether byproduct in the dispersion.

If elevated pressures are employed, the fluoroether byproduct formed may be present is a liquid and may be removed by various methods such as decantation under pressure or reducing the pressure to flash the liquid fluoroether to vapor which can be vented for removal.

In preferred forms of the invention, at least about 80% of the fluoroether byproduct is removed from the dispersion, more preferably at least about 90%.

In accordance with a preferred embodiment of the invention, the fluoroether byproduct is captured. When the fluoroether byproduct is a vapor, this preferably is accomplished by passing gasses vented from the vessel to a bed of adsorbent particles. By the term "adsorbent particles" in connection with the present invention is meant particles that are capable of physically adsorbing the fluoroether byproduct by any mechanism of physical adsorption. In a preferred embodiment of the invention, the vapor of fluoroether byproduct present in the vent stream is captured in a bed of activated carbon.

In a one embodiment of the invention, the fluoroether byproduct that is captured is recovered. When a bed of activated carbon is employed, recovery is advantageously accomplished by thermal desorbtion the fluoroether byproduct from the adsorbent particles. Steam stripping is a suitable method. Solvent extraction followed by solvent separation, e.g., distillation, can also be employed for recovery. As discussed previously, recovered fluoroether byproducts are useful as solvents and as intermediates in the manufacture of other products.

Alternatively, captured fluoroether byproducts can be disposed of in an environmentally sound manner. For example, when an activated carbon bed is employed, activated carbon saturated with fluoroether byproduct can be burned.

Concentration

Many grades of fluoropolymer dispersion, especially those for use in dispersion coating formulations, are employed in concentrated form. The present invention provides a process which coordinates well with dispersion concentration operations.

In one embodiment of the invention, the heating of the stabilized aqueous fluoropolymer dispersion to decarboxylate the fluoroether carboxylic acid or salt causes evaporation of water from the stabilized aqueous fluoropolymer dispersion and at least partially concentrates the dispersion. If desired, vacuum can be applied to increase the rate of evaporation. The evaporation is advantageously performed simultaneously with the decarboxylation. When evaporation is used for concentration, the process is not cloud point sensitive, enabling a broad selection of stabilizers to be used such as those imparting properties desirable for end applications. Additional concentration can be carried out if desired by another method such as thermal phase separation or ultrafiltration as discussed below. In one embodiment of the invention, concentration to the final solids content is carried out by evaporation.

Concentration can be carried out by known methods such as thermal phase separation as disclosed in U.S. Pat. No. 3,037,953, and ultrafiltration as disclosed in U.S. Pat. No. 4,369,266. Concentration is by thermal phase separation is advantageously used as discussed in more detail below.

For concentration by thermal phase separation, it is advantageous for stabilizer used in decarboxylation to be nonionic surfactant and, as known in the art, the nonionic surfactant should have a suitable cloud point for phase separation. Because the dispersion is heated for both decarboxylation of the fluoroether carboxylic acid are salt and for concentration, it can increase efficiency to link these operations so that the dispersion is only heated to elevated temperatures once for both operations.

In one embodiment of the invention, the heating of the stabilized aqueous fluoropolymer dispersion to decarboxylate the fluoroether carboxylic acid or salt causes the dispersion to be heated to a temperature above the cloud point of the nonionic surfactant and the process further comprises cooling the dispersion to the cloud point range of the nonionic surfactant to cause the thermal phase separation. For example, if decarboxylation carried out at a temperature of 90° C. and the cloud point range of the nonionic surfactant is ~70° C., the dispersion can be cooled to the cloud point range to cause phase separation and the supernatant decanted off to produce a concentrated dispersion. "Cloud point range of the nonionic surfactant" as used in this application means the temperature range within which the particular dispersion containing that nonionic surfactant undergoes phase separation. This embodiment of the invention can be practiced by cooling to slightly below the cloud point range and bringing the temperate back up to the cloud point range.

If desired, decarboxylation and concentration can be carried out in separate vessels with transfer between vessels being performed to maintain the dispersion temperature as needed. In another embodiment of the invention which can result in significant process simplification, the heating to decarboxylate the fluoroether carboxylic acid or salt and the concentrating of the dispersion by thermal phase separation are performed in a single vessel.

Test Methods

The melting point (Tm) and glass transition temperature (Tg) of copolymers is measured by Differential Scanning Calorimetry according to the procedure of ASTM D 4591. PTFE homopolymer melting point, the melting point the first time the polymer is heated, also referred to as the first heat, is determined by differential scanning calorimetry (DSC) by the method of ASTM D-4591-87. The melting temperature reported is the peak temperature of the endotherm on first melting.

Standard specific gravity (SSG) (PTFE) is measured by the method of ASTM D-4895.

Comonomer content (PPVE or HFP) is measured by FTIR according to the method disclosed in U.S. Pat. No. 4,743,658, col. 5, lines 9-23.

Melt flow rate (MFR) is measured according to ASTM D-1238 at the temperature which is standard for the specific copolymer.

Raw dispersion particle size (RDPS) is measured by photon correlation spectroscopy using a Microtrac®Nanotrac Particle Size Analyzer.

Temperature of Complete Weight Loss is measured by Thermal Gravimetric Analysis with Infrared analyzer (TGA/IR) using a TA Q500 TGA coupled with a Nicolet FT-IR instrument.

Temperature of Maximum Decarboxylation is measured by Thermal Gravimetric Analysis with Infrared analyzer (TGA/IR) using a TA Q500 TGA coupled with a Nicolet FT-IR instrument. The temperature at which $CO_2$ evolution is highest is the Temperature of Maximum Decarboxylation.

Decarboxylation Half Life $t_{1/2}$ at 200° C. is measured by headspace Gas Chromatography/Mass Selective Detector analysis (GC/MSD) by monitoring the formation of the corresponding hydrofluoroether while heating the ammonium salt of the fluoroether carboxylic acid at 200° C. For the analysis, a kinetic plot is constructed using known concentrations of the fluoroether ammonium salt in separate headspace vials heated in an over at 200° C. At selected time intervals, the headspace of each vial is analyzed by GC/MSD with the amount of hydrofluoroether detected and estimated to construct the kinetic plot.

Number and Weight Average Molecular Weight and n in Formula (I) for Fluoropolyether Carboxylic Acid or Salt— The weight average molecular weight of the mixture of fluoropolyether acids or salts is determined by gas chromatography (GC) on an instrument equipped with either a flame ionization detector (FID) or a mass selective detector (MSD). Gas chromatography is suitably conducted on a chromatographic instrument such as an Agilent Model 6890. The fluoropolyether carboxylic acid or salt is first dissolved in a suitable solvent such as 2,3-dihydrodecafluoropentane (Vertrel® XF available from the DuPont Company) prior to GC injection. Typically, the fluoropolyether acid or salt with a concentration of less than 1% in the solvent are injected to a GC injector port which has a typical injector temperature of ≧300° C. For the purpose of this test method, the high temperature in the injector port will thermally convert the injected fluoropolyether acid or salt to the corresponding hydrofluoropolyether (Formula VI). The retention time of the different oligomers can be obtained using reference standards of known Formula VI composition. The area of each oligomer (GC area %) is measured and used to calculate the weight average molecular weight. The number average molecular weight is calculated from weight average molecular weight using standard formulas and is also independently measured using 19F NMR spectroscopy. Molecular weights are reported in this application as the carboxylic acid and not the converted hydrofluoroether compound. Average n in Formula (I) is derived from the weight average molecular weight.

The amount of fluoropolyether carboxylic acid or salt having a molecular weight above or below a certain level, e.g., 2500 g/mol or greater (or n being 13 or greater in Formula (I) is determined from the same data used for weight average molecular weight. Since GC area % values are a good approximation of weight percent, GC area % values for the oligomers in the range of interest can be added together to determine the weight percent of oligomers in the range of interest.

Special selective ion monitoring (SIM) detection mode of the GC using a mass selector detector is utilized for the quantification for perfluoropolyether acid or salt of Formula (I) in which n=1 and calibration standards of known concentrations are prepared.

Fluoroether carboxylic acid/salt content is determined by gas chromatography (GC) in which the fluoroether acid/salt is esterified with acidic methanol. Perfluoroheptanoic acid ("C7") in methanol is used as an internal standard. Fluoroether carboxylic acid/salt in water is used as an external standard.

For dispersion samples containing perfluoroalkane carboxylic acids or salts, dispersion samples assayed by esterification have been dried to eliminate the interference of the esterification reaction by $H_2O$. For dispersions with fluoroether carboxylic acid/salt in the presence of nonionic surfactant, the drying step is eliminated to avoid interference of the nonionic surfactant in masking detection of the fluoroether carboxylic acid/salt. Although the presence of water can depress the formation of methyl ester products, the use of aqueous internal and external standards minimizes the effect and allows for quantitative determination of the fluoroether carboxylic acid/salt. Best accuracy is achieved if the total amount of water in each sample is constant.

In particular for fluoropolymer dispersions prepared in the examples of this invention, a nominal sample size of 0.5 g of dispersion is placed in a 50 mL vial, the vial having been previously weighed. Standard aqueous solutions of fluorocarboxylic acid/ether are similarly placed in 50 mL vials for comparison. All vials are accurately weighed to determine sample weight. To each vial, 1 mL of "methanolic internal standard" (nominal 100 ppm C7 in methanol) and 10 mL of methanolic HCl are added. Sealed vials are heated in a water bath at 55±5° C. for 60 minutes. After the vials are cooled and pressure is vented, 10 mL hexane is added to each sample, swirling each vial to mix contents. 20 mL of NaCl solution (nominal 15 wt %) is subsequently added and the vial is subjected to vigorous shaking. Upon addition of the NaCl and hexane, the ester is extracted into the upper hexane layer. The hexane layer is analyzed by injection onto a glass GC column of 20 ft.×2 mm I.D. packed with 10% OV-210 on 70/80 mech Chromosorb W.AW.DMCS. held at 90° C. The detector is ECD and the carrier gas of 95% argon/5% methane has a flow rate of 20 to 30 ml/min.

Quantification is based on "peak area" of fluorocarboxylic acid/salt and C7 peaks. For each run (sample and standard), a response ratio is calculated by dividing the area of the fluorocarboxylic acid/salt peak by the area of the C7 (internal standard) peak. A calibration plot of response ("area ratio") vs. amount (μg) for each standard is prepared. Linear regression of the calibration plot is performed to determine slope and y-intercept. From the regression parameters, the amount of fluorocarboxylic acid/salt (μg) for the samples is calculated. Concentration is calculated as μg fluorocarboxylic acid/salt per g of original sample (wet basis).

EXAMPLES

Examples

Decarboxylation of Branched and Linear Fluoroether Carboxylic Acid Salts

The Temperature of Complete Weight Loss, the Temperature of Maximum Decarboxylation, and Decarboxylation Half Life ($t_{1/2}$) at 200° C. are measured for ammonium salts of selected branched and linear fluoroether carboxylic acids. The results are reported in Table 1 below.

The data in Table 1 shows that the Temperature of Maximum Decarboxylation and the Decarboxylation Half Life ($t_{1/2}$) at 200° C. are significantly lower for branched fluoroether carboxylic acids than for linear fluoroether carboxylic acids.

TABLE 1

| Compound | Linear/Branched | Temp/C. Complete Wt Loss* | Temp/C. Max Decarboxylation** | $t_{1/2\ (min)}$ at 200° C. in air*** |
|---|---|---|---|---|
| $C_3F_7OCF(CF_3)CO_2NH_4$ | Branched | 197 | 207 | ~5 |
| $C_2F_5OCF(CF_3)CO_2NH_4$ | Branched | 189 | 178 | ~10 |
| $C_2F_5O(CF_2)_3CO_2NH_4$ | Linear | 180 | 240 | ~90 |
| $C_2F_5O(CF_2)_5CO_2NH_4$ | Linear | 179 | 240 | |
| $C_3F_7O(CF_2)_2CO_2NH_4$ | Linear | 190 | 247 | ~90 |
| $C_3F_7O(CF_2)_3CO_2NH_4$ | Linear | 180 | 240 | |
| $C_3F_7O(CF_2)_5CO_2NH_4$ | Linear | 181 | 240 | |

*temp at which all samples were either evaporated or decomposed (decarboxylated).
**temp at which maximum amount of CO2 was observed during the TGA experiments.
***half life of surfactants to undergo decarboxylation at 200 C in air.

Examples

Thermal Reduction of Fluoroether Carboxylic Acids or Salts from Fluoropolymer Dispersions The following Examples 1A, 1B, 2A, 2B, and 2C illustrate reduction of fluoropolyether acids or salts from fluoropolymer dispersions polymerized as described in Examples A, B and C using polymerization agents comprising branched fluoroether carboxylic acids or salts.

Polymerization Agent Components

Branched fluoroether carboxylic acid is employed having the formula $CF_3CF_2CF_2OCF(CF_3)COOH$ (referred to as dimer acid or DA) which is converted to the ammonium salt in the examples which follow (referred to as dimer acid salt or DAS).

A mixture of fluoropolyether carboxylic acids is employed (referred to as PFPEA), having the structure of Formula (II) ($Y^+$ is H). The acids are converted to ammonium salts in the examples which follow.

The molecular weight distribution of the mixture of fluoropolyether carboxylic acids used in the example is listed in Table 1A. Average values listed in the table are based on number average molecular weight with the exception of the column labeled weight average molecular weight.

TABLE 1A

| | | | | Molecular Weight Distribution of PFPEA Mixture | | | | |
|---|---|---|---|---|---|---|---|---|
| PFPE | # Avg MW | Wt Avg MW | Avg n | ppm n = 1 | % n ≦ 4 | % n ≧ 13 | % n ≧ 16 | % n = 3 to n = 13 |
| | 1556 | 1669 | 7.4 | 10 | 5.069 | 3.726 | 1.257 | 97.484 |

The ammonium hydroxide used is a 30 wt % aqueous solution (wt % calculated as NH$_4$OH).

Polymerization agent mixtures are prepared as follows resulting in water clear or nearly water clear mixtures. The amounts of PFPEA and DA as stated in the examples are combined in a 100 mL glass jar and vigorously stirred for ~5 to 30 minutes. The indicated amount of 30% ammonium hydroxide solution (NH$_4$OH) was slowly added to the PFPEA/DA mixture while cooling in a water bath to produce a concentrate.

Stabilizer

Tergitol® TMN-100X is an aliphatic alcohol ethoxylate nonionic surfactant available from the Dow Corporation. The surfactant comprises a blend of about 30% Tergitol® TMN-6 and about 70% Tergitol® TMN-10, which are ethoxylates of 2,6,8-trimethyl-4-nananol. TMN-6 nominally has an average of about 6 ethylene oxide (EO) units and TMN 10 nominally has an average of about 10 EO units. The cloud point range of Tergitol® TMN-100X is 61-69° C.

Examples A-C

Preparation of Fluoropolymer Dispersions

Example A

Preparation of TFE/HFP Copolymer Dispersion (FEP)

A cylindrical, horizontal, water-jacketed, paddle-stirred, stainless steel reactor having a length to diameter ratio of about 1.5 and a water capacity of 10 gallons (37.9 L) is charged with polymerization agent mixture (1.8 g of PFPEA, 120 g DA, 30 ml NH4OH) and 48 pounds (21.8 kg) of deionized water. The jar that had been used for polymerization agent mixture is rinsed twice with about 20 mL of deionized water each time, and the contents of each rinse are added to the reactor. With the reactor paddle agitated at 90 rpm, the reactor is heated to 30° C. for 5 minutes to mix the reactor contents. With the reactor paddle agitated at 46 rpm, the reactor is heated to 65° C., evacuated and purged three times with TFE. The reactor temperature then is increased to 103° C. After the temperature has become steady at 103° C., HFP is added slowly to the reactor until the pressure is 486 psig (3.35 MPa). Then TFE is added to the reactor to achieve a final pressure of 650 psig (4.48 MPa). Then 20 mL of freshly prepared aqueous initiator solution containing 3.60 wt % of ammonium persulfate (APS) is charged into the reactor. A freshly prepared aqueous initiator solution containing 3.60 wt % of ammonium persulfate (APS) is pumped into the reactor at a ratio of 0.0278 pound of solution per pound of TFE for the remainder of the polymerization after polymerization has begun as indicated by a 10 psi (70 kPa) drop in reactor pressure. Additional TFE is also added to the reactor beginning at kickoff at a rate of 21.5 lb (9.75 kg)/160 min until a total of 21.5 lb (9.75 kg) of TFE has been added to the reactor after kickoff. The total reaction time is 160 min after initiation of polymerization. At the end of the reaction period, the TFE feed and the initiator feed are stopped, and the reactor is cooled while agitating at a reduced speed of 10 rpm. When the temperature of the reactor contents reaches 90° C., agitation is stopped and the reactor is slowly vented. After venting to nearly atmospheric pressure, the reactor is purged with nitrogen to remove residual monomer. Upon further cooling, the dispersion is discharged from the reactor at below 70° C. Solids content of the dispersion is 37.16 wt % and RDPS is 190 nm. The TFE/HFP copolymer (FEP) has a melt flow rate (MFR) of 1.94 g/10 min and an HFP content of 11.41 wt.

Properties of the FEP dispersion are reported in Table 2.

Example B

Preparation of PTFE Dispersion

A cylindrical, horizontal, water-jacketed, paddle-stirred, stainless steel reactor having a length to diameter ratio of about 1.5 and a water capacity of 10 gallons (37.9 L) is charged with 41 pounds (18.6 kg) of demineralized water and 900 g of paraffin wax. While agitating at 50 rpm the reactor is charged with polymerization agent mixture (4.0 g of PFPEA, 200 g DA, 45 ml NH4OH). The jar that had been used for polymerization agent mixture is rinsed twice with about 50 mL of demineralized water each time, and the contents of each rinse are added to the reactor. While continuing agitating at 50 rpm additional ingredients are added to the reactor (60 mL of 1 w/w % methanol with 15 mL of 1 w/w % Triton® X-100 solution combined with demineralized water to a total volume of 500 mL). While agitating at 50 rpm, the contents of the reactor are heated to 65° C., and the reactor is evacuated and purged three times with tetrafluoroethylene (TFE). The reactor temperature is increased to 90° C. and TFE is added until the pressure is 380 psig (2.62 MPa). Then, 285 mL of an aqueous initiator solution comprised of 0.6 g of disuccinic peroxide (DSP) and 0.6 g of ammonium phosphate in 500 mL of demineralized water is added at the rate of 60 mL/min. TFE is added at a rate of 0.6 lb/min to maintain pressure between 50 psig and 380 psig (0.34 to 2.62 MPa). After 3 lbs (6.6 kg) of TFE has been added following initial pressurization, an aqueous initiator solution comprised of 7.5 g of disuccinic peroxide (DSP) in 1000 mL of demineralized water is added at the rate of 25 mL/min. After a total of 30 lbs (13.6 kg) of TFE has been fed following initial pressurization, TFE addition is stopped and the reaction is allowed to continue until reactor pressure drops to 175 psig (1.21 MPa) and then the reactor is vented. The contents of the reactor are cooled to between 60° C. and 85° C., discharged from the reactor, and the supernatant wax is removed. Solids content of the dispersion is 44.2 wt % and the raw dispersion particle size (RDPS) is 186 nm.

Properties of the PTFE dispersion are reported in Table 2.

TABLE 2

Dispersion Properties Prior to Heat Treatment

| Example | DA/DAS Content | Solids (wt %) | RDPS (nm) | MFR | SSG |
|---|---|---|---|---|---|
| Dispersion A FEP | 2460 | 37.2 | 190 | 1.94 | — |
| Dispersion B PTFE | 6340 | 44.2 | 186 | — | 2.2466 |

Example 1A

Thermal Treatment of
FEP (Dispersion A) at ~100° C.

FEP dispersion (Dispersion A) is prepared as described above and filtered. Tergitol® TMN-100X (15.2 g) is added to 537 g of filtered dispersion to stabilize the dispersion. Stabilized dispersion (428 g) is placed in a 3-neck flask which is fitted with a condenser cooled to 15° C. with chilled water and nitrogen purge. The stabilized dispersion is heated to a temperature maintained at 98-100° C., so as to avoid boiling the dispersion, for 8 hours. The DA/DAS is decarboxylated to byproduct E1 (boiling point 46° C.) and E1 is removed by evaporation into a controlled disposal system. The residual DA/DAS content of samples of the dispersion is determined on unconcentrated samples at various time intervals as recorded in Table 3.

After three hours of heating the dispersion, residual DA/DAS, a branched fluoroether carboxylic acid, is determined to be less than 10 ppm. After 8 hours of heating, the residual DA/DAS content is below detectable limits (ND) by the instrumentation being used.

The dispersion is cooled and the solids content is determined to be 36.03 wt % with 7.68 wt % stabilizer content based on polymer solids.

The dispersion is concentrated by thermal phase separation according to the procedures used in U.S. Pat. No. 3,037,953 to Marks and Whipple by further adding 5.1 g of stabilizer Tergitol® TMN-100 X and 4 ml NH$_4$OH (aq. solution, 29 wt % as NH$_3$) to 250 g of the treated dispersion and holding the polymer dispersion at 68° C. (a temperature that is above the cloud point range of the stabilizer) for two hours. Concentration appeared to be complete in less than 30 minutes. The concentrated dispersion is separated from the supernate and the dispersion is cooled. The solids content of the concentrated dispersion is determined to be 62.69 wt % with 5.30 wt % stabilizer content based on polymer solids.

Example 1B

Thermal Treatment of FEP (Dispersion A) at ~80° C.

FEP dispersion (Dispersion A) is prepared as described above and filtered. Tergitol® TMN-100X (15.0 g) is added to 559 g of filtered dispersion to stabilize the dispersion. Stabilized dispersion (400 g) is placed in a 3-neck flask which is fitted with a condenser cooled to 15° C. with chilled water and nitrogen purge. The stabilized dispersion is heated to a temperature maintained at 78-82° for 15 hours. The DA/DAS is decarboxylated to byproduct E1 and the E1 is removed by evaporation into a controlled disposal system. The residual DA/DAS content of samples of the dispersion is determined on unconcentrated samples at various time intervals as recorded in Table 3. After 15 hours of heating the dispersion, residual DA/DAS, a branched fluoroether carboxylic acid, is determined to be less than 500 ppm.

The dispersion is cooled and the solids content is determined to be 36.16 wt % with 7.24 wt % stabilizer content based on polymer solids.

Using the procedure and same conditions as described in Example 1A, the dispersion is concentrated by thermal phase separation. Concentration appears complete in less than 60 minutes. The solids content of the concentrated dispersion is determined to be 62.14 wt % with 5.33 wt % stabilizer content based on polymer solids

TABLE 3

Thermal Treatment FEP

| Polymer Dispersion | Temperature (° C.) | Time (hrs) | DA/DAS Content (ppm) |
|---|---|---|---|
| Ex 1A - FEP | 98-100 | 0 | 2117 |
|  |  | 0.75 | 1854 |
|  |  | 1.5 | 8.66 |
|  |  | 3.5 | 9.65 |
|  |  | 5.5 | *ND |
|  |  | 8 | *ND |
|  | Room Temp | 24 (unconcentrated, after cooling) | *ND |
| Ex 1B - FEP | 78-82 | 0 | 2336 |
|  |  | 0.5 | 2306 |
|  |  | 1 | 2230 |
|  |  | 1.5 | 2155 |
|  |  | 2.5 | 1979 |
|  |  | 3.5 | 1802 |
|  |  | 4.5 | 1663 |
|  |  | 5.5 | 1462 |
|  |  | 6.5 | 1283 |
|  |  | 7.5 | 1161 |
|  |  | 8.5 | 1020 |
|  |  | 15 | <500 |

*ND = Not Detectable

Example 2A

Thermal Treatment of
PTFE (Dispersion B) at ~100° C.

PTFE dispersion (Dispersion B) is prepared as described above and filtered. Tergitol® TMN-100X (10.0 g) is added to 400 g of filtered dispersion to stabilize the dispersion. The mixture is placed in a long neck flask with no condenser unit The stabilized dispersion is heated to a gentle boil at a temperature of ~100° C. for 5 hours without reflux (other than reflux provided by the neck of the flask), no nitrogen purge and no stirring. The DA/DAS is decarboxylated to byproduct E1 (boiling point 46° C.) and E1 is removed by evaporation into a controlled disposal system. The residual DA/DAS content of samples of the dispersion is determined at various time intervals as recorded in Table 4.

After three hours of heating the dispersion, residual DA/DAS, a branched fluoroether carboxylic acid, is determined to be less than 141 ppm. After 4 hours of heating, the residual DA/DAS content is determined to be less than 1 ppm.

The dispersion is cooled and filtered, removing 25 g of wet polymer coagulum. The solids content of the cooled dispersion after filtering out the wet polymer coagulum is determined to be 43.91 wt % with 5.82 wt % stabilizer content based on polymer solids.

Example 2B

Thermal Treatment of PTFE (Dispersion B) at ~95° C.

PTFE dispersion (Dispersion B) is prepared as described above and filtered. Tergitol® TMN-100X (17 g) is added to 400 g of filtered dispersion to stabilize the dispersion. The mixture is placed in a long neck flask with no condenser unit. The stabilized dispersion is heated to a temperature of ~95° C. for 7 hours without reflux (other than reflux provided by the neck of the flask), no nitrogen purge and no stirring. The DA/DAS is decarboxylated to byproduct E1 (boiling point 46° C.) and E1 is removed by evaporation into a controlled disposal system. The residual DA/DAS content of samples of the dispersion is determined at various time intervals as recorded in Table 4.

After 6.67 hours of heating the dispersion, residual DA/DAS, a branched fluoroether carboxylic acid, is determined to 273 ppm.

It is noted that the dispersion occasionally concentrates during heating and thermal phase separation (concentrated phase/supernate phase) occurs. On these occasions the dispersion is gently remixed. Further concentration occurs when heating is completed as the dispersion is cooled.

The dispersion is cooled and filtered, removing 6 g of wet polymer coagulum which is noticeably less than Example 2A. The formation of less coagulum is attributed to using lower temperature to heat the dispersion thereby minimizing boiling of the dispersion.

The solids content of the cooled dispersion after filtering out the wet polymer coagulum is determined to be 52.93 wt % with 4.99 wt % stabilizer content based on polymer solids.

Example 2C

Thermal Treatment of PTFE (Dispersion B) at ~80° C. and Concentration in Single Vessel PTFE dispersion (Dispersion B) is prepared as described above and filtered. Tergitol® TMN-100X (17 g) is added to 400 g of filtered dispersion to stabilize the dispersion. The mixture is placed in a 1000 ml three neck glass reactor with no condenser unit. Stoppers are loosely placed in the unused openings into the reactor. The reactor includes a suspended agitation system which is a disc [2.5" (63 mm)] containing 4 cut-out blades, each angled at about 15 degrees. The stabilized dispersion is heated to a temperature of ~80° C. for 15 hours without reflux, no nitrogen purge and with agitation. Agitation is initiated at 50 rpm and then increased to 150 rpm after the first hour of heating. Increased agitation prevents thermal phase separation. The DA/DAS is decarboxylated to byproduct E1 (boiling point 46° C.) and E1 is removed by evaporation into a controlled disposal system. The residual DA/DAS content of samples of the dispersion is determined at various time intervals as recorded in Table 4.

After 15 hours of heating the dispersion, residual DA/DAS, a branched fluoroether carboxylic acid, is determined to less than 500 ppm.

The dispersion is allowed to concentrate in the same glass reactor without removing the dispersion by lowering the temperature to 68° C. and allowing the temperature of the dispersion to approach the cloud point range of the stabilizer. After one hour, thermal phase separation (concentrated phase/supernate phase) occurs. The concentrated dispersion is separated from the supernate. Thermal treatment and concentration occur in a single vessel. The dispersion is cooled and filtered, removing 0.5 g of wet polymer coagulum which is noticeably less than Examples 2A and 2B. The formation of less coagulum is attributed to heating at a lower temperature which minimizes boiling of the dispersion.

The solids content of the concentrated dispersion is determined to be 58.94 wt % with 3.78 wt % stabilizer content based on polymer solids.

TABLE 4

Thermal Treatment PTFE

| Polymer Dispersion | Temperature ° C. | Time hrs | DA/DAS Content ppm |
|---|---|---|---|
| Ex 2A - PTFE (33 s) | 100 | 0 | 6091 |
| | | 2 | 1313 |
| | | 3 | 141 |
| | | 4 | <1 |
| | | 5 | 16 |
| | | 6 | <1 |
| Ex. 2B - PTFE (33 s) | 95 | 0 | 6480 |
| | | 2 | 4115 |
| | | 3.67 | 2096 |
| | | 6.67 | 273 |
| Ex. 2C - PTFE (33s) | 80 | 0.25 | 6489 |
| | | 1 | 5792 |
| | | 2 | 5108 |
| | | 3 | 4474 |
| | | 4 | 3195 |
| | | 8 | 1947 |
| | | 11 | 828 |
| | | 15 | <500 |

What is claimed is:

1. A process for reducing the fluoroether carboxylic acid or salt content of aqueous fluoropolymer dispersion, said fluoroether carboxylic acid or salt having the formula:

[R$^1$—O-L-COO$^-$]Y$^+$ wherein:
R$^1$ is a linear, branched or cyclic partially or fully fluorinated aliphatic group which may contain ether linkages;
L is a branched partially or fully fluorinated alkylene group which may contain ether linkages; and
Y$^+$ is hydrogen, ammonium or alkali metal cation;
said process comprising:
adding stabilizer to said aqueous fluoropolymer dispersion to form stabilized aqueous fluoropolymer dispersion;
heating said stabilized aqueous fluoropolymer dispersion to decarboxylate said fluoroether carboxylic acid or salt to produce a fluoroether byproduct; and
removing a portion or all of said fluoroether byproduct.

2. The process of claim 1 wherein L is a branched fully fluorinated alkylene group which may contain ether linkages.

3. The process of claim 1 wherein L is —CF(CF$_3$)—.

4. The process of claim 1 wherein said fluoroether carboxylic acid or salt comprises a compound or a mixture of compounds with R$^1$ being CF$_3$—CF$_2$—CF$_2$—O—(—CFCF$_3$—CF$_2$—O—)$_n$ and n is 0-35, L is —CF(CF$_3$)—.

5. The process of claim 4 wherein n is 0-10.

6. The process of claim 4 wherein n is 0-3.

7. The process of claim 4 wherein n is 0.

8. The process of claim 1 wherein Y$^+$ is hydrogen or ammonium.

9. The process of claim 1 wherein said process provides a stabilized aqueous fluoropolymer dispersion comprising less than 500 ppm fluoroether carboxylic acid or salt.

10. The process of claim 1 where said stabilized aqueous fluoropolymer dispersion is heated to a temperature which causes reduction of fluoroether carboxylic acid or salt to a desired level in less than 24 hours.

11. The process of claim 1 wherein said stabilized aqueous fluoropolymer dispersion is heated to a temperature of about 70° C. to about 200° C.

12. The process of claim 1 wherein said fluoroether byproduct is removed as a vapor.

13. The process of claim 1 further comprising capturing said fluoroether byproduct.

14. The process of claim 13 wherein said capturing said fluoroether byproduct is performed using a bed of adsorbent particles.

15. The process of claim 14 wherein said bed of adsorbent particles is activated carbon.

16. The process of claim 13 wherein said captured fluoroether byproduct is recovered.

17. The process of claim 16 wherein said recovery comprises thermally desorbing said fluoroether byproduct from said adsorbent particles.

18. The process of claim 1 wherein said fluoroether carboxylic acid or salt has a decarboxylation half-life in ammonium salt form of less than 30 minutes at 200° C.

19. The process of claim 1 wherein said heating of said stabilized aqueous fluoropolymer dispersion to decarboxylate said fluoroether carboxylic acid or salt causes evaporation of water from said stabilized aqueous fluoropolymer dispersion and concentrates said dispersion.

20. The process of claim 1 wherein said stabilizer is nonionic surfactant.

21. The process of claim 20 further comprising concentrating said dispersion by thermal phase separation.

22. The process of claim 21 wherein said heating to decarboxylate said fluoroether carboxylic acid or salt and said concentrating of said dispersion are performed in a single vessel.

23. The process of claim 22 wherein said heating of said stabilized aqueous fluoropolymer dispersion to decarboxylate said fluoroether carboxylic acid or salt causes said dispersion to be heated to a temperature above the cloud point of said nonionic surfactant and said process further comprises cooling said dispersion to the cloud point range of said nonionic surfactant to cause said thermal phase separation.

* * * * *